(12) United States Patent
Kikuchi

(10) Patent No.: US 12,138,535 B2
(45) Date of Patent: Nov. 12, 2024

(54) NON-TRANSITORY COMPUTER-READABLE STORAGE MEDIUM STORING PROGRAM, INFORMATION PROCESSING METHOD, AND SYSTEM

(71) Applicant: KONAMI DIGITAL ENTERTAINMENT CO., LTD., Tokyo (JP)

(72) Inventor: Keita Kikuchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 249 days.

(21) Appl. No.: 17/713,728

(22) Filed: Apr. 5, 2022

(65) Prior Publication Data

US 2022/0226726 A1    Jul. 21, 2022

Related U.S. Application Data

(63) Continuation of application No. PCT/JP2020/038447, filed on Oct. 12, 2020.

(30) Foreign Application Priority Data

Oct. 25, 2019  (JP) ................. 2019-194760

(51) Int. Cl.
- *A63F 13/35* (2014.01)
- *A63F 13/335* (2014.01)
- *A63F 13/86* (2014.01)
- *H04L 67/131* (2022.01)

(52) U.S. Cl.
CPC ............ *A63F 13/35* (2014.09); *A63F 13/335* (2014.09); *A63F 13/86* (2014.09); *H04L 67/131* (2022.05)

(58) Field of Classification Search
CPC ....................................................... A63F 13/86
See application file for complete search history.

(56) References Cited

U.S. PATENT DOCUMENTS

| 7,458,894 | B2 | 12/2008 | Danieli et al. |
| 10,363,488 | B1* | 7/2019 | Willette ................. A63F 13/63 |

(Continued)

FOREIGN PATENT DOCUMENTS

| EP | 1 637 197 A1 | 3/2006 |
| JP | 6547032 B1 | 7/2019 |

(Continued)

OTHER PUBLICATIONS

Extended European Search Report dated Oct. 24, 2022 in European Application No. 20879709.2.

(Continued)

*Primary Examiner* — Jay Trent Liddle
(74) *Attorney, Agent, or Firm* — Sughrue Mion, PLLC

(57) ABSTRACT

A program according to the present invention causes a computer to function as: an information acquirer that acquires transmission information from a plurality of terminals every predetermined period of time, the transmission information including operation-related information that is generated by each of the plurality of terminals in the predetermined period of time according to a user operation, an information manager that saves the transmission information that follows a predetermined rule, among a plurality of pieces of the transmission information acquired in each predetermined period of time, and a transmission controller that transmits the transmission information that is saved, to a terminal requesting acquisition of information.

10 Claims, 11 Drawing Sheets

(56) References Cited

U.S. PATENT DOCUMENTS

| | | | |
|---|---|---|---|
| 10,484,439 B2* | 11/2019 | Oates, III | A63F 13/86 |
| 2006/0058103 A1* | 3/2006 | Danieli | A63F 13/87 |
| | | | 463/42 |
| 2011/0263333 A1 | 10/2011 | Dokei et al. | |
| 2014/0113718 A1* | 4/2014 | Norman | A63F 13/822 |
| | | | 463/31 |
| 2017/0001112 A1* | 1/2017 | Gilmore | A63F 13/49 |
| 2017/0246544 A1* | 8/2017 | Agarwal | A63F 13/63 |
| 2018/0197172 A1* | 7/2018 | Coburn | H04L 9/321 |
| 2020/0282311 A1* | 9/2020 | Kawakami | A63F 13/45 |
| 2021/0106920 A1* | 4/2021 | Lim | A63F 13/335 |

FOREIGN PATENT DOCUMENTS

| | | |
|---|---|---|
| JP | 2019-154467 A | 9/2019 |
| JP | 2019-180944 A | 10/2019 |

OTHER PUBLICATIONS

International Search Report dated Dec. 8, 2020 from the International Searching Authority in International Application No. PCT/JP2020/038447.

Written Opinion dated Dec. 8, 2020 from the International Searching Authority in International Application No. PCT/JP2020/038447.

International Preliminary Report on Patentability with the translation of Written Opinion dated Apr. 26, 2022 from the International Bureau in International Application No. PCT/JP2020/038447.

Office Action dated Jul. 21, 2020 from the Japanese Patent Office in JP Application No. 2019-194760.

Communication issued Apr. 12, 2023 in European Application No. 20 879 709.2.

Communication dated Apr. 12, 2024 issued by the Korean Patent Office in application No. 10-2022-7013020.

* cited by examiner

FIG. 5

| | UP | DOWN | RIGHT | LEFT | X | Y | A | B | L1 | L2 | R1 | R2 | RIGHT STICK | LEFT STICK | FRAME NUMBER |
|---|---|---|---|---|---|---|---|---|---|---|---|---|---|---|---|
| Bit | 1 | 1 | 1 | 1 | 1 | 1 | 1 | 1 | 1 | 1 | 1 | 1 | 16 | 16 | 16 |

FIG. 6

| | UP | DOWN | RIGHT | LEFT | X | Y | A | B | L1 | L2 | R1 | R2 | RIGHT STICK | LEFT STICK | FRAME NUMBER |
|---|---|---|---|---|---|---|---|---|---|---|---|---|---|---|---|
| C1 | 1 | 1 | 1 | 1 | 1 | 1 | 1 | 1 | 1 | 1 | 1 | 1 | 16 | 16 | 16 |
| C2 | 1 | 1 | 1 | 1 | 1 | 1 | 1 | 1 | 1 | 1 | 1 | 1 | 16 | 16 | 16 |
| C3 | 1 | 1 | 1 | 1 | 1 | 1 | 1 | 1 | 1 | 1 | 1 | 1 | 16 | 16 | 16 |

NON-TRANSITORY COMPUTER-READABLE STORAGE MEDIUM STORING PROGRAM, INFORMATION PROCESSING METHOD, AND SYSTEM

CROSS-REFERENCE TO RELATED APPLICATIONS

This application is a continuation application of International Application PCT/JP2020/038447 filed on Oct. 12, 2020, and designated the U.S., which claims the benefit of priority of the prior Japanese Patent Application No. 2019-194760, filed on Oct. 25, 2019, the entire contents of which are incorporated herein by reference.

TECHNICAL FIELD

The present invention relates to a program, an information processing apparatus, an information processing method, and a system.

BACKGROUND ART

Communication between a plurality of client terminals connected over a network is sometimes performed through Peer to Peer (P2P) communication. For example, in the case of an online competitive game system, game terminals (client terminals) of players playing the game are connected by P2P, and information about progress of the game is sequentially transmitted to a server from the game terminals.

Patent Literature 1 discloses a management server that is capable of communicating with a first game device that generates progress data about progress of a game and result data about a result of the game, and a second game device for viewing the game, the management server including a processor.

CITATION LIST

Patent Literature

Patent Literature 1: Japanese Laid-open Patent Publication No. 2019-154467

SUMMARY OF INVENTION

Technical Problem

A game image that is displayed on a plurality of client terminals (hereinafter "terminal(s)") performing P2P communication is normally displayed only on the terminals that are connected over a network and that are performing P2P communication, but there is a demand to watch (view) the video image with terminals other than the terminals that are performing P2P communication (that is, terminals of users not playing the game). In such a case, one of the terminals performing P2P communication acts as a representative and transmits information about progress of the game and the like to a server, and the server transmits information necessary for displaying the game image to other terminals. However, if the terminal acting as a representative is disabled from performing communication, the game image may not be watched with other terminals.

The present invention has been made in view of the problem as described above, and has its object to allow a game image from a plurality of terminals connected over a network to be continuously watched with other terminals.

Solution to Problem

A program according to the present invention is a program for causing a computer to function as: an information acquirer that acquires transmission information from a plurality of terminals every predetermined period of time, the transmission information including operation-related information that is generated by each of the plurality of terminals in the predetermined period of time according to a user operation, an information manager that saves the transmission information that follows a predetermined rule, among a plurality of pieces of the transmission information acquired in each predetermined period of time, and a transmission controller that transmits the transmission information that is saved, to a terminal requesting acquisition of information.

BRIEF DESCRIPTION OF DRAWINGS

FIG. 5 is a diagram showing an example of operation-related information.
FIG. 6 is a diagram showing an example of the operation-related information included in transmission information transmitted from the game machine to a first server.

DESCRIPTION OF EMBODIMENTS

Hereinafter, preferred embodiments of the present invention will be described with reference to the appended drawings.

In the present embodiments, an online competitive game system will be cited as an example in relation to communication, via a server, between client terminals connected over a network. In the online competitive game system, game machines (client terminals) of players playing the game are connected over a network, and information about progress of the game is transmitted from the game machines to other game machines. In the game system according to the present embodiments, information about progress of the game is transmitted via a server (a TURN server). In the case of the present embodiments, a plurality of game machines participating in the online competition communicates operation-related information that each generated, via the server, as information about progress of the game. The operation-related information is information including operation information that is generated by a game controller provided in the game machine. The game controller is provided with operators such as various buttons, a lever (a stick) and the like, and the game controller generates the operation information according to user operations on the operators. The operation-related information is information including, in addition to the operation information generated by the game controller, frame number information indicating each of frame periods that are each a predetermined period of time that is taken as a unit of game processing, identification information of the game machine, and the like.

1. Outline of Game System of First Embodiment

Figure 1:
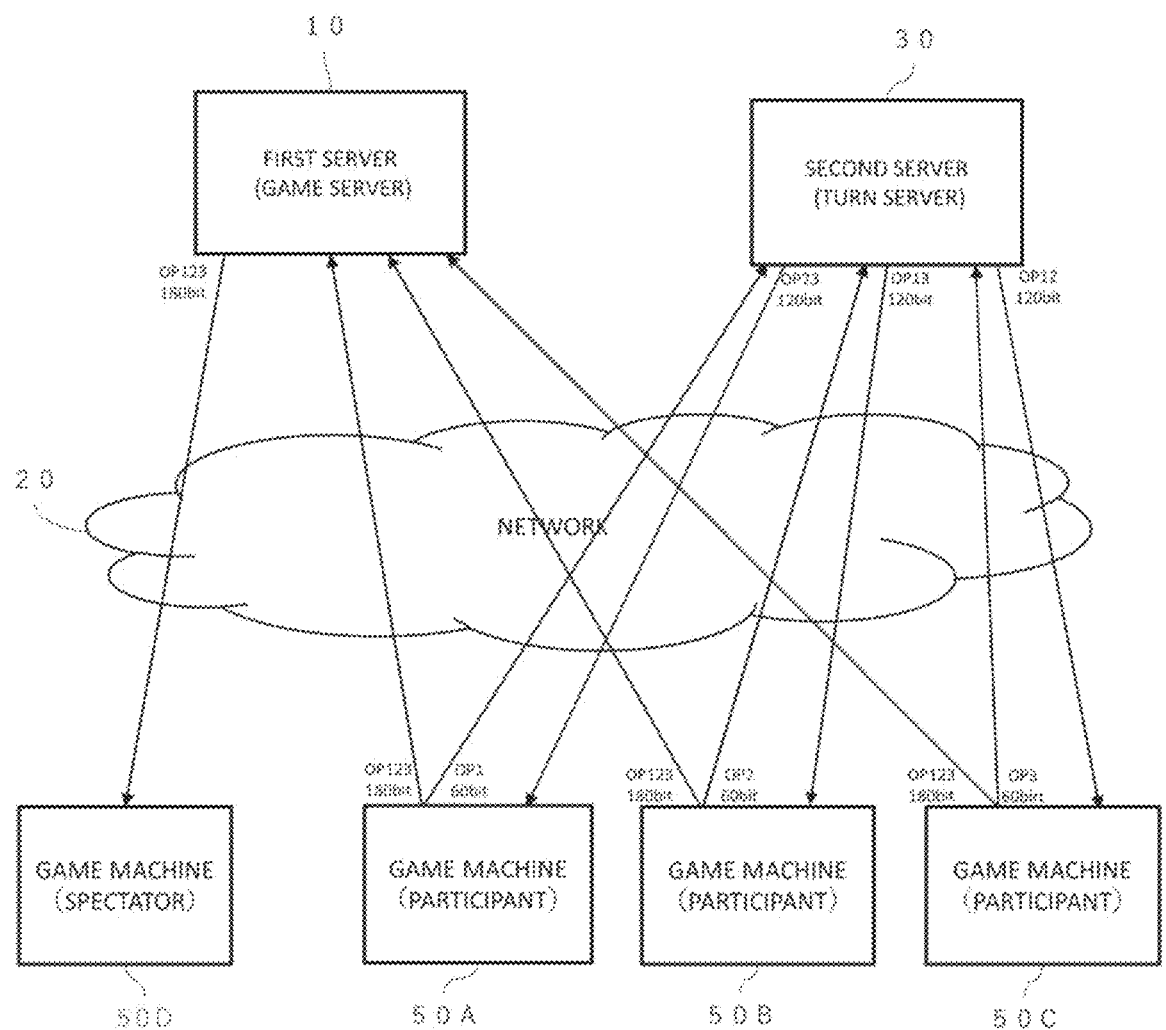
FIG. 1 is a diagram showing an example configuration of a game system.

FIG. 1 is a diagram showing a schematic example configuration of a game system according to a first embodiment.

For example, the game system according to the present embodiment includes a first server 10, a second server 30, game machines 50A, 50B, 50C of users (participants) participating in a competition (an online competition) over a network 20, and a game machine 50D of a user (a spectator) viewing (watching) the online competition among the game machines 50A, 50B, 50C.

The first server 10 is an example of an information processing apparatus according to the embodiments of the present invention, and is a game server that performs information management and the like in relation to saving of competition data and the like of an online competitive game performed over a network, and to viewing of the game. In the case of the present embodiment, the competition data saved by the first server 10 is transmission information including the operation-related information, described later, transmitted from the game machines 50A, 50B, 50C of participants of the online competition, for example. The second server 30 is a TURN server for performing information communication among the game machines 50A, 50B, 50C connected over a network.

The game machines 50A, 50B, 50C each transmit, to the second server 30 that is a TURN server, operation-related information including operation information generated by a respective game controller in a frame period that is a predetermined period of time. In the example in FIG. 1, the game machine 50A transmits operation-related information OP1 including the operation information generated by the connected game controller in the frame period to the second server 30, and likewise, the game machine 50B transmits operation-related information OP2 generated by the game controller in the frame period to the second server 30, and the game machine 50C transmits operation-related information OP3 including the operation information generated by the game controller in the frame period to the second server 30. In this manner, each game machine 50A, 50B, 50C in the game system of the present embodiment transmits the operation-related information OP1, OP2, OP3 including the operation information generated by the respective game controller in the predetermined period to the second server 30.

The second server 30 that is a TURN server transmits, to the game machine 50A, operation-related information OP23 including the operation-related information OP2 from the game machine 50B and the operation-related information OP3 from the game machine 50C. In the same manner, the second server 30 transmits, to the game machine 50B, operation-related information OP13 including the operation-related information OP1 from the game machine 50A and the operation-related information OP3 from the game machine 50C, and transmits, to the game machine 50C, operation-related information OP12 including the operation-related information OP1 from the game machine 50A and the operation-related information OP2 from the game machine 50B.

The game machine 50A transmits, to the first server 10, transmission information including operation-related information OP123 including the operation-related information OP1 and the operation-related information OP23 received from the second server 30. In the same manner, the game machine 50B transmits, to the first server 10, transmission information including the operation-related information OP123 including the operation-related information OP2 and the operation-related information OP13 received from the second server 30. The game machine 50C transmits, to the first server 10, transmission information including the operation-related information OP123 including the operation-related information OP3 and the operation-related information OP12 received from the second server 30. That is, the game machines 50A, 50B, 50C in the game system of the present embodiment each transmit, to the first server 10, transmission information including the operation-related information OP1, OP2, OP3 generated by the game machines 50A, 50B, 50C, every frame period that is a predetermined period of time.

The first server 10 acquires the transmission information that is transmitted from each game machine 50A, 50B, 50C in each frame period. That is, the first server 10 acquires the operation-related information OP123 (that is, the operation-related information OP1, OP2, OP3) for each frame period, by acquiring the transmission information from each game machine 50A, 50B, 50C.

The first server 10 performs information management in such a way that saving of the transmission information is performed according to a predetermined rule, from the plurality of pieces of transmission information transmitted from the game machines 50A, 50B, 50C in each frame period. In the present embodiment, as information management following the predetermined rule, the first server 10 saves, among the plurality of pieces of transmission information acquired from the game machines 50A, 50B, 50C in each frame period, the transmission information that is acquired first, and does not save second and later pieces of transmission information or discards such transmission information after temporarily saving the same.

Then, in the case where acquisition of game information of the online competition is requested by the game machine 50D of the spectator viewing (watching) the online competition among the game machines 50A, 50B, 50C, the first server 10 performs transmission control in such a way that the transmission information saved in the manner described above, that is, the operation-related information OP1, OP2, OP3, is transmitted to the game machine 50D requesting acquisition of the game information.

2. Schematic Configuration of First Server

Figure 2:
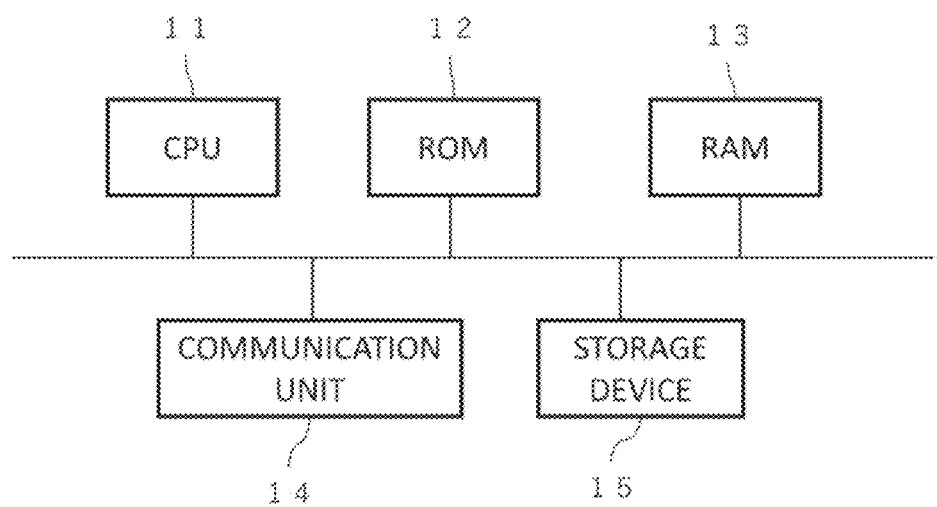
FIG. 2 is a diagram showing an example configuration of a server.

FIG. 2 is a diagram showing an example configuration of the first server 10.

The first server 10 includes a CPU 11, a ROM 12, RAM 13, a communication unit 14, and a storage device 15.

The CPU 11 performs various processes by reading control programs stored in the ROM 12 into the RAM 13. The ROM 12 stores control programs (OS and the like) necessary for operation of the first server 10. A flash memory (NVRAM) may be used instead of the ROM 12. The RAM 13 is used as a temporary storage region such as a main memory, a work area or a buffer of the CPU 11. The communication unit 14 performs a process of communicating with each game machine 50A, 50B, 50C, the game machine 50D, and other external apparatuses over the network 20. The storage device 15 stores programs related to the online competitive game according to the present embodiment, user identification information, such as IDs, of the users operating the game machines 50A, 50B, 50C, 50D, and various other pieces of information about each user necessary for the game. Additionally, some of these pieces of information may be stored in a database or the like, not shown.

3. Schematic Configuration of Second Server

The second server 30 that is a TURN server has a configuration that is basically the same as the one shown in FIG. 2, and a description thereof will be given with reference to FIG. 2. In the case of the second server 30, the ROM 12 stores control programs (OS and the like) necessary for operation of the second server 30. The CPU 11 performs various processes by reading the control programs stored in the ROM 12 into the RAM 13. The RAM 13 is the same as that of the first server 10, and a description thereof is omitted. The communication unit 14 of the second server 30 performs a process of communicating with each game machine 50A, 50B, 50C, and other external apparatuses over the network 20. The storage device 15 stores programs related to control of communication with the game machines 50A, 50B, 50C as described above, and various other pieces of information necessary for communication.

4. Schematic Configuration of Game Machine

Figure 3:
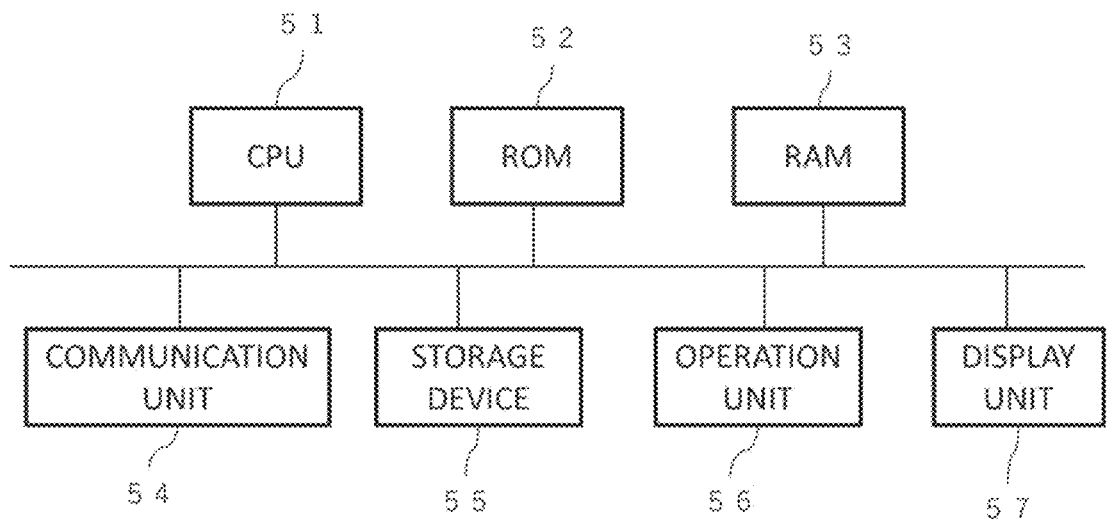
FIG. 3 is a diagram showing an example configuration of a game machine.

FIG. 3 is a diagram showing an example configuration of one of the game machines 50A, 50B, 50C participating in the online competitive game. Additionally, in the present embodiment, the game machine 50D for viewing the online competition has basically the same configuration as the game machines 50A, 50B, 50C participating in the online competition, and thus, illustration of the configuration of the game machine 50D is omitted. Furthermore, in the following description, when not distinguishing the game machines 50A, 50B, 50C, 50D from one another, a term "game machine(s) 50" will be simply used.

For example, the game machine 50 is a home game machine, a mobile communication device such as a smartphone, a dedicated portable game device, a personal computer, a tablet or the like.

The game machine 50 includes a CPU 51, a ROM 52, a RAM 53, a communication unit 54, a storage device 55, an operation unit 56, and a display unit 57.

The CPU 51 performs various processes by reading control programs stored in the ROM 52 into the RAM 53. The ROM 52 stores control programs (OS and the like) necessary for operation of the game machine 50. A flash memory (NVRAM) may be used instead of the ROM 52. The RAM 53 is used as a temporary storage region such as a main memory, a work area or the like of the CPU 51. The communication unit 54 performs a process of communicating with the first server 10, the second server 30, and other external apparatuses over the network 20. The operation unit 56 is for receiving various operations by the user, and a game controller that comes with a home game machine, a touch panel of the display unit 57 and the like correspond to the operation unit 56, for example. The display unit 57 displays various pieces of information, such as a screen for a game, on a display device such as a liquid crystal display. The storage device 55 mainly stores game programs of a game, and various pieces of data related to the game.

Additionally, functions and processes of the game machine 50 are implemented by the CPU 51 reading programs stored in the ROM 52 or the storage device 55 and executing the programs. Furthermore, in another example, the CPU 51 may read programs stored in a removable storage medium such as an SD card, instead of reading programs stored in the ROM 52 or the like. Furthermore, means for supplying the programs to a computer may be a computer-readable storage medium such as a CD-ROM storing the programs, or a transmission medium for transmitting the program, such as the Internet.

5. Schematic Configuration of Game Controller

Figure 4:
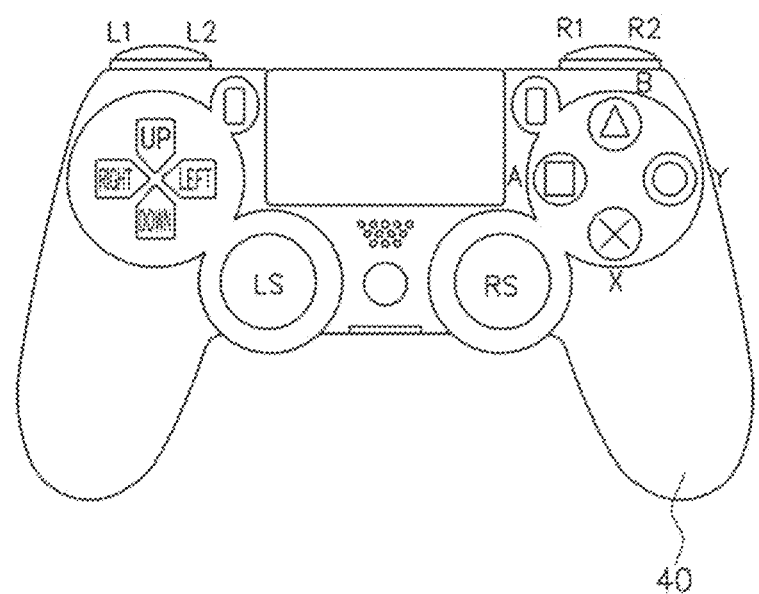
FIG. 4 is a diagram schematically showing an external appearance of a game controller.

FIG. 4 is a diagram schematically showing an example of an external appearance of a game controller 40 that is connected to the game machine 50. Additionally, the game controller 40 shown in FIG. 4 is merely an example, and shape and the like are not limited to the illustrated example.

The game controller 40 is connected to the game machine 50 in a wired or wireless manner. The game controller 40 includes a plurality of operators. The plurality of operators include various operators such as an up button, a down button, a right button, a left button, a left stick (an LS lever), a right stick (an RS lever), an A button (a square button), a B button (a triangle button), an X button (a cross mark button), a Y button (a circle button), an L1 button, an L2 button, an R1 button, an R2 button and the like. Functions of these operators are widely known, and a detailed description thereof is omitted.

When an operator is operated by the user, the game controller 40 generates operation information according to the user operation and transmits the operation information to the game machine 50. For example, with the game controller 40, the state of each operator is scanned every predetermined period of time (in each frame period), and operation information indicating the scanning result is transmitted to the game machine 50.

6. Outline of Operation-Related Information

FIG. 5 is a diagram showing an example of the operation-related information including the operation information that is generated by the game controller 40 when each operator is operated and the frame number information that is generated by the game machine 50 and that indicates the frame period. "Up" to "left stick" in the upper section in FIG. 5 correspond to respective operators, from the up button to the left stick (the LS lever), of the game controller 40, and numbers in the lower section each indicate the number of bits of the operation information that is generated when a corresponding operator is operated. For example, pieces of operation information for the up button to the R2 button are each expressed in 1 bit, and pieces of operation information for the right stick (the RS lever) and the left stick (the LS lever) are each expressed in 16 bits. Furthermore, the frame number is expressed in 16 bits. Accordingly, the operation-related information OP1, OP2, OP3 generated by each of the game machines 50A, 50B, 50C described above is 60-bit information. Furthermore, the operation-related information OP23, OP13, OP12 that is transmitted from the second server 30 to the game machine 50A, 50B, 50C is 120-bit information.

FIG. 6 is a diagram showing the operation-related information and the frame number information included in the transmission information that is transmitted from the game machine 50A, 50B, 50C to the first server 10. "Up" to "frame number" in FIG. 6 are the same as those in the example in FIG. 5, and "C1" in FIG. 6 indicates the operation-related information and the frame number information of the game machine 50A, "C2" indicates the operation-related information and the frame number information of the game machine 50B, and "C3" indicates the operation-related information and the frame number information of the game machine 50C. Accordingly, the operation-related information OP123 that is transmitted from the game machine 50A, 50B, 50C as described above to the first server 10 is 180-bit information.

Figure 7:
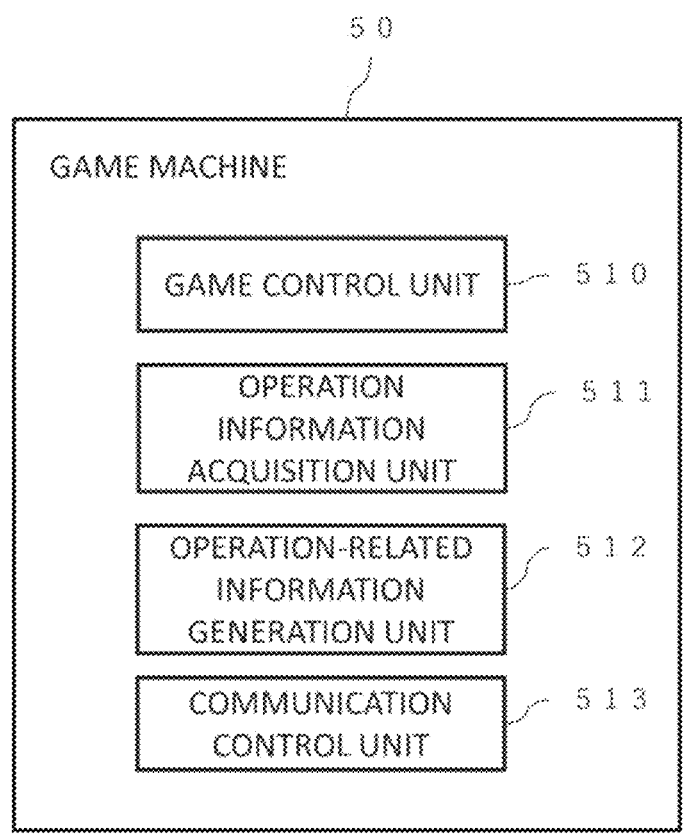
FIG. 7 is a block diagram showing an example functional configuration of the game machine.

7. Functional Configuration of Game Machine Participating in Online Competition FIG. 7 is a block diagram showing an example functional configuration of the game machine 50 participating in an online competition. With the game machine 50 participating in an online competition, the CPU 51 shown in FIG. 3 reads programs stored in the ROM 52 or the storage device 55 and executes the programs to implement functions of a game control unit 510, an operation information acquisition unit 511, an operation-related information generation unit 512, and a communication control unit 513.

With the game machine 50 in FIG. 7, the game control unit 510 performs various processes and control for an online competitive game.

The operation information acquisition unit 511 acquires, in each frame period, the operation information based on operation of each operator of the game controller 40 by the user.

The operation-related information generation unit 512 generates the operation-related information including the operation information that is generated by the game controller 40, the frame number information indicating the frame period that is a unit of game processing, identification information of the game machine 50, and the like.

The communication control unit 513 performs various processes and control related to communication of the operation-related information as described above performed with the second server 30, and communication of the transmission information as described above with the first server 10.

8. Functional Configuration of First Server and Flow of Processes

Figure 8:
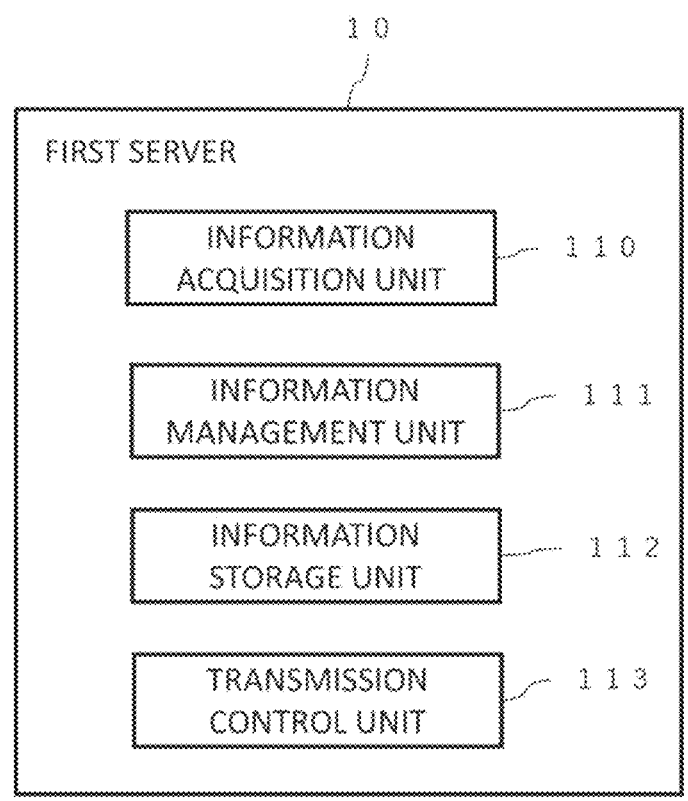
FIG. 8 is a block diagram showing an example functional configuration of the first server.

FIG. 8 is a block diagram showing an example functional configuration of the first server 10. With the first server 10, the CPU 11 shown in FIG. 2 reads programs stored in the ROM 12 or the storage device 15 and executes the programs to implement functions of an information acquisition unit 110, an information management unit 111, an information storage unit 112, and a transmission control unit 113.

The information acquisition unit 110 acquires the transmission information including the operation-related information OP123 that is generated by the plurality of game machines 50A, 50B, 50C in the frame period (a predetermined period of time) in response to user operations on the game controllers 40, from terminals of the plurality of game machines 50A, 50B, 50C in each frame predetermined period.

Among the plurality of pieces of transmission information transmitted from the game machines 50A, 50B, 50C in each frame period, the information management unit 111 saves (causes the information storage unit 112 to save) the first transmission information, according to a predetermined rule that is a rule indicating that the transmission information that is transmitted first is saved and the transmission information that is transmitted second or later is not saved. At this time, the information storage unit 112 causes the storage device 15 in FIG. 2 to store the first transmission information, for example.

In the case where there is a request for acquisition of information from the game machine 50D of the spectator, the transmission control unit 113 transmits, to the game machine 50D, the transmission information that is saved in the information storage unit 112 (the transmission information that is received first). In the case of the present embodiment, the game machine 50D of the spectator transmits information requesting viewing of the online competitive game to the first server 10, and the transmission control unit 113 transmits the transmission information to the game machine 50D in response to the request. Additionally, in the case where there is a plurality of game machines 50D requesting acquisition of information, the transmission control unit 113 transmits the transmission information that is saved, to the plurality of game machines 50D.

Figure 9:
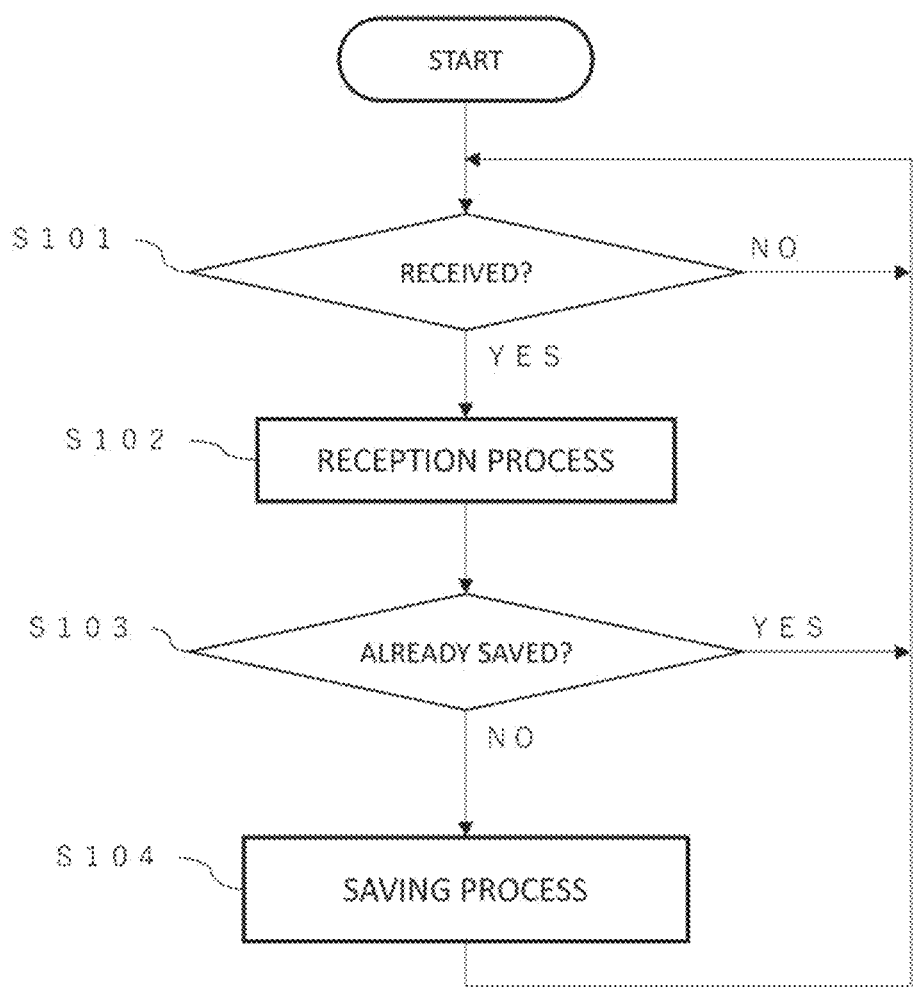
FIG. 9 is a flowchart showing a flow of processes performed by the first server of a first embodiment, from reception of the transmission information from the game machine to saving of the same.

FIG. 9 is a flowchart showing a flow of processes performed by the first server 10, from reception of the transmission information from the game machine 50A, 50B, 50C of the participant to saving of the same.

In the following, the functional configuration in FIG. 7 will be described with reference to the flowchart in FIG. 9.

In the process in step S101, the information acquisition unit 110 of the first server 10 determines whether the transmission information including the operation-related information OP123 described above is received from the game machine 50A, 50B, 50C of the participant, and in the case of determining that reception is not performed, the determination process in step S101 is repeated. In the case where it is determined that the transmission information including the operation-related information OP123 is received, the information acquisition unit 110 proceeds to the process in step S102.

When the process proceeds to step S102, the information management unit 111 acquires information about the frame number from the operation-related information OP123 included in the transmission information that is temporarily stored in a reception buffer region provided in the RAM 13 in FIG. 2.

Next, in step S103, the information management unit 111 determines whether the frame number in the operation-related information OP123 included in the transmission information that is received in step S101 is the same as the frame number in the operation-related information OP123 included in the transmission information that is temporarily saved in the reception buffer. That is, the information management unit 111 checks whether the operation-related information OP123 with the same frame number as the operation-related information OP123 received in step S101 is already saved in the reception buffer.

In the case where it is confirmed that the operation-related information OP123 with the same frame number as the operation-related information OP123 received in step S101 is already saved in the reception buffer, the information management unit 111 controls the information storage unit 112 such that the transmission information received in step S101 is not saved, and then returns the process to step S101.

By contrast, in the case where the operation-related information OP123 with the same frame number as the operation-related information OP123 received in step S101 is not yet saved in the reception buffer, the information management unit 111 saves (controls the information storage unit 112 to save), in step S104, the transmission information received in step S101, and then returns the process to step S101.

That is, with information management following the predetermined rule, the information management unit 111 of the first server 10 saves the transmission information that is acquired first, among pieces of transmission information acquired in step S101 in each frame period, and does not save the second and later pieces of transmission information.

Figure 10:
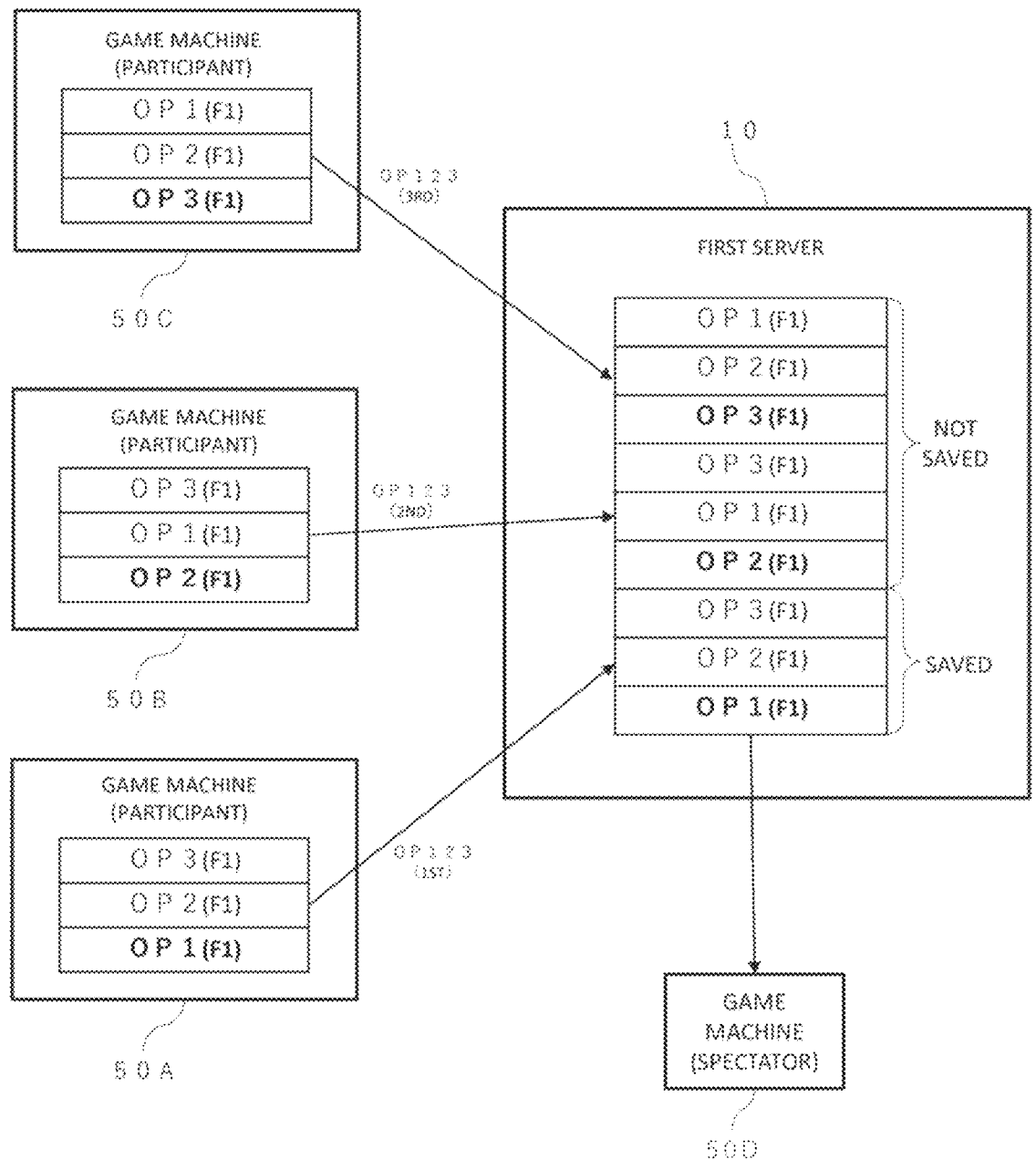
FIG. 10 is a diagram schematically showing information management following a predetermined rule in the first embodiment.

FIG. 10 is a diagram schematically showing information management processing following the predetermined rule.

The game machines 50A, 50B, 50C shown in FIG. 10 each transmit, to the first server 10, the transmission information including the operation-related information OP123 (information including the operation-related information OP1, OP2, OP3), where frame numbers take the same value, that is, a frame number F1. In the example in FIG. 10, the first server 10 is assumed to receive the transmission information including the operation-related information OP123 from the game machine 50A first, and then receive the transmission information including the operation-related information OP123 from the game machine 50B second, and then receive the transmission information including the operation-related information OP123 from the game machine 50C third. In this case, the first server 10 saves the transmission information including the operation-related information OP123 from the game machine 50A that is received first, and does not save the second and later pieces of transmission information including the operation-related information OP123 that are received from the game machines 50B and 50C. Then, in the case where there is a request for game information from the game machine 50D of the spectator, the first server 10 transmits, to the game machine 50D, the transmission information including the operation-related information OP123 from the game machine 50A that is received first and that is saved.

As described above, in the first embodiment, the game machines 50A, 50B, 50C participating in the online competition transmit, to the first server 10, pieces of transmission information including the operation-related information OP123 whose frame numbers take the same value, and the first server 10 saves the transmission information that is received first among the pieces of information received. That is, in the case of the first embodiment, even if the game machine 50A, among the game machines 50A, 50B, 50C, is disabled from performing communication, for example, the first server 10 may acquire the transmission information from the game machine 50B, and moreover, even if the game machine 50B is also disabled from performing communication, for example, the transmission information from the game machine 50C may be acquired. Accordingly, even when one or some of the game machines 50A, 50B, 50C are disabled from performing communication, the first server 10 may acquire and save the operation-related information OP123 indicating the progress of the online competitive game being played by the game machines 50A, 50B, 50C. Therefore, according to the first embodiment, even when one or some of the game machines 50A, 50B, 50C are disabled from performing communication, the operation-related information OP123 that enables reproduction of the competition results for the game machines 50A, 50B, 50C may be transmitted to the game machine 50D of the spectator. At the game machine 50D, game processing is performed based on the acquired operation-related information OP123, and a game image for viewing is generated and displayed on a liquid crystal display or the like of the display unit 57. As a result, the user (the spectator) of the game machine 50D may view details of the competition among the game machines 50A, 50B, 50C. That is, according to the present embodiment, an image from a client terminal that is connected over a network (the game machine participating in an online competition) may be properly watched with another client terminal (the game machine of the spectator).

9. Second Embodiment

In the first embodiment described above, in relation to information management following a predetermined rule, an example is cited where the transmission information that is acquired first is saved, among a plurality of pieces of transmission information that are acquired in each frame period, but in a second embodiment, an example of information management following a predetermined rule based on hash information will be described. Configurations of a game system, each server, and each game machine according to the second embodiment are approximately the same as those of the first embodiment described above, and illustration thereof is omitted. In the following, a description is given in relation to parts different from those of the first embodiment.

In the case of the second embodiment, the game machines 50A, 50B, 50C participating in an online competition communicate operation-related information OP1, OP2, OP3 to which hash information that each generated is attached, via the second server 30 in the same manner as in the first embodiment. Then, the game machines 50A, 50B, 50C each transmit, to the first server 10, the transmission information including the operation-related information OP123 including the operation-related information OP1, OP2, OP3 to which the hash information is attached.

The functional configuration of the game machines 50A, 50B, 50C of the present embodiment is the same as the configuration shown in FIG. 7 described above, and the operation-related information generation unit 512 generates the operation-related information to which the hash information is attached. Other functions are as described above.

In the case of the present embodiment, as information management following a predetermined rule, the first server 10 performs a process of saving transmission information including same pieces of hash information, among a plurality of pieces of transmission information that are transmitted from the plurality of game machines 50A, 50B, 50C in each frame period and that are received, and of not saving the transmission information including different pieces of hash information.

The functional configuration of the first server 10 of the present embodiment is the same as the configuration shown in FIG. 8 described above, and the information management unit 111 performs information management of saving the transmission information including same pieces of hash information, among a plurality of pieces of transmission information that are received, and of not saving the transmission information including different pieces of hash information. Other functions are as described above, and for example, in the case where there is a plurality of pieces of transmission information that include same pieces of hash information, the transmission information that is received first, among the pieces of transmission information, may be saved without saving the second and later pieces of transmission information.

Figure 11:
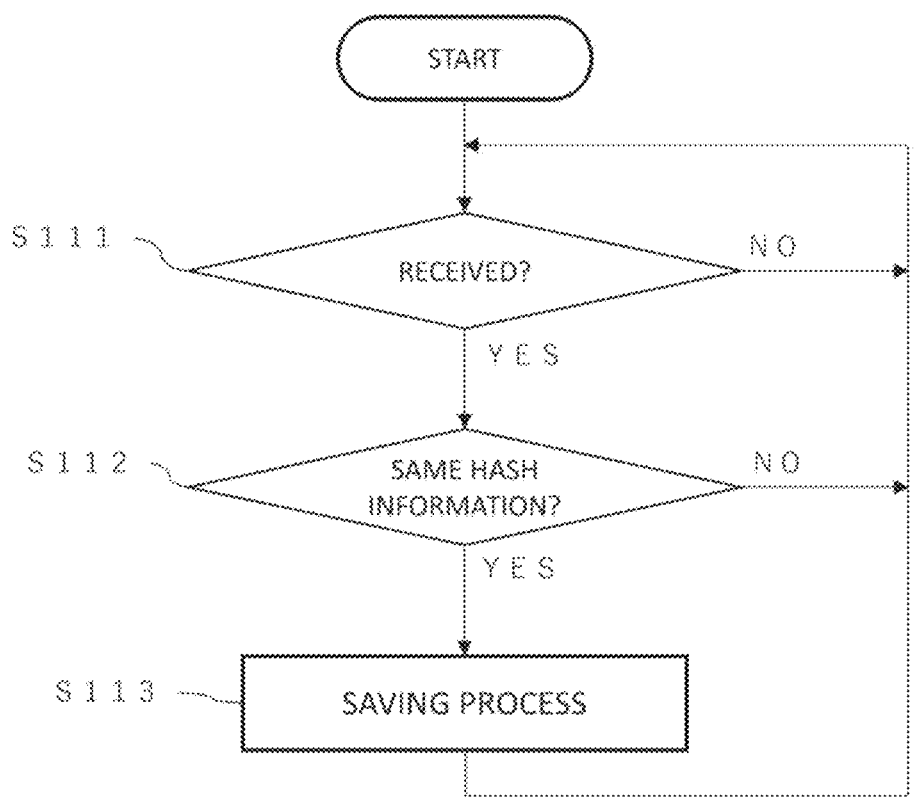
FIG. 11 is a flowchart showing a flow of processes performed by the first server of a second embodiment, from reception of the transmission information from the game machine to saving of the same.

FIG. 11 is a flowchart showing a flow of processes by the first server 10 of the second embodiment.

In step S111, as in step S101 in FIG. 9 described above, the information acquisition unit 110 of the first server 10 of the present embodiment determines whether the transmission information including the operation-related information OP123 is received from the game machine 50A, 50B, 50C of the participant, and in the case where it is determined that reception is not performed, the determination process in step S101 is repeated. In the case where it is determined that the transmission information including the operation-related information OP123 is received, the information acquisition unit 110 proceeds to the process in step S112.

When the process proceeds to step S112, the information management unit 111 determines whether the pieces of hash information in the operation-related information OP123 included in the transmission information received in step S111 are the same pieces of information. In the case of confirming that all the pieces of hash information included in the operation-related information OP123 received in step S111 are the same pieces of information, the information management unit 111 proceeds to step S113, saves the transmission information received in step S111, and returns the process to step S111.

By contrast, in step S112, in the case where the pieces of hash information of the operation-related information OP123 received in step S111 include different pieces of information, the information management unit 111 does not save (does not cause the information storage unit 112 to save) the transmission information received in step S111, and returns the process to step S111.

That is, with information management following the predetermined rule in the case of the present embodiment, the first server 10 saves only the transmission information for which the pieces of hash information included in the operation-related information are the same pieces of information, among pieces of transmission information acquired in step S111 in each frame period, and does not save other pieces of transmission information.

Figure 12:
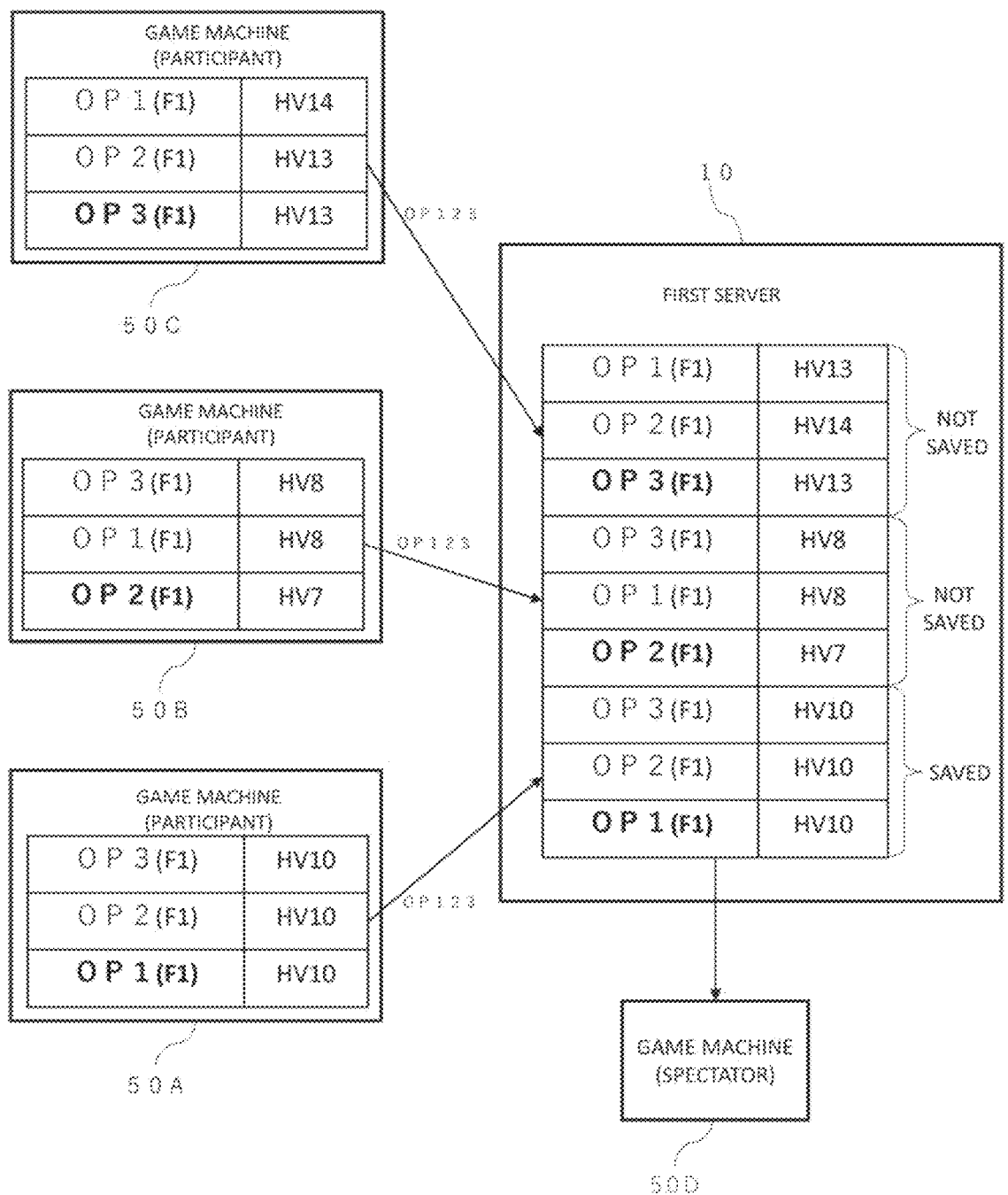
FIG. 12 is a diagram schematically showing information management following a predetermined rule in the second embodiment.

FIG. 12 is a diagram schematically showing information management processing following the predetermined rule that uses the hash information.

The game machines 50A, 50B, 50C shown in FIG. 12 each transmit, to the first server 10, the transmission information including the operation-related information OP123 (information including the operation-related information OP1, OP2, OP3), where frame numbers take the same value, that is, a frame number F1. However, in the example in FIG. 12, pieces of hash information attached to the operation-related information OP123 in the transmission information from the game machine 50A are all same hash information HV10, but pieces of hash information attached to the operation-related information OP123 in the transmission information from the game machine 50B include different pieces of hash information HV7 and HV8. Furthermore, pieces of hash information attached to the operation-related information OP123 in the transmission information from the game machine 50C include different pieces of hash information HV13 and HV14.

Accordingly, the first server 10 saves the transmission information including the operation-related information OP123 to which the same pieces of hash information HV10 are attached, and does not save other pieces of transmission information. Moreover, in the case where there is a request for information for viewing from the game machine 50D of the spectator, the first server 10 transmits, to the game machine 50D, the transmission information including the operation-related information OP123 from the game machine 50A that is saved in the above manner.

10. Example of Information Management Based on Number of Pieces of Same Hash Information In the example described above, an example is cited where the first server 10 does not save the transmission information including the operation-related information to which different pieces of hash information are attached; in another example of the information management following a predetermined rule, pieces of operation-related information for which there is a greater number of same pieces of hash information may be saved among a plurality of pieces of operation-related information OP1, OP2, OP3 included in the transmission information.

With reference to the example in FIG. 12, it is assumed that the first server 10 is not able to receive the transmission information from the game machine 50A due to communication failure or the like, but acquires the transmission information from the game machine 50B and the game machine 50C, for example.

In this case, of the operation-related information OP123 included in the transmission information from the game machine 50B, the first server 10 saves pieces of the operation-related information OP1 and OP3 to which the same hash information HV8 is attached, and does not save the operation-related information OP2 to which a different hash information HV7 is attached. In the same manner, of the operation-related information OP123 included in the transmission information from the game machine 50C, the first server 10 saves pieces of the operation-related information OP3 and OP2 to which the same hash information HV13 is attached, and does not save the operation-related information OP1 to which a different hash information HV14 is attached.

Additionally, in the case of this example, two pieces of the operation-related information OP3 with the same frame number are to be present. The information management unit 111 may save the two pieces of operation-related information OP3, or may save the one that is received first without saving the one that is received later, for example.

Then, in the case where there is a request for information for viewing the competition from the game machine 50D of the spectator to the first server 10, the transmission control unit 113 transmits, to the game machine 50D, the operation-related information OP1, OP2, OP3 with the same frame number, among the pieces of operation-related information saved in the above manner.

In the second embodiment, the game machines 50A, 50B, 50C participating in an online competition each transmit, to the first server 10, the transmission information including pieces of the operation-related information to which pieces of the hash information are attached, and the first server 10 saves the transmission information including pieces of the operation-related information to which the same hash information is attached. Therefore, according to the second embodiment, in the case where an illicit process is performed by the game machine 50A, 50B or 50C, for example, information based on the illicit process may be excluded, and information on which an illicit process is not performed may be transmitted to the game machine 50D of the spectator, and the competition among the game machines 50A, 50B, 50C may be correctly viewed with the game machine 50D. That is, according to the second embodiment, an image from a client terminal that is connected over a network (the game machine participating in an online competition) may be properly watched with another client terminal (the game machine of the spectator).

11. Modifications

Embodiments of the present invention have been described in detail with reference to the drawings, but specific configurations are not limited to those of the embodiments described above, and changes may be made as appropriate within the scope of the present invention. For example, the first server 10 and the second server 30 may be configured as one server. Furthermore, the number of game machines 50 of participants of an online competition is not limited to three, and may be two or four or more. Furthermore, communication may be performed between the game machines 50 participating in the online competition. The game machines 50 participating in the competition may perform communication through so-called P2P (Peer to Peer). In this case, a TURN server that is the second server 30 may be omitted. Moreover, the number of game machines 50D of spectators of the online competition is not limited to one, and may be two or more. In the embodiments described above, the frame period as a unit of game processing is given as the predetermined period of time, but a period of time other than the frame period may also be used. Furthermore, in the embodiment described above, the hash information includes information such as a checksum, CRC, MD5, SHA or the like, for example. In the present embodiment, data comparison may be performed without using the hash information.

In FIG. 6, the frame number is prepared for each of C1, C2, C3, but it suffices if there is one frame number.

In relation to FIG. 5, a description "the operation-related information OP23, OP13, OP12 that is transmitted from the second server 30 to the game machine 50A, 50B, 50C is 120-bit information" is given assuming that data of the source itself is omitted, but data of the source itself may be included to obtain 160-bit information. By including the data of the source itself, and transmitting the same data regardless of the connected terminal, the transmission process by the second server may be made the same.

In the embodiments described above, the operation-related information is described to be information including the operation information that is generated by operation of an operator of the game controller by the user, but information obtained by processing the operation information of the game controller, such as information that is generated by each game machine 50A, 50B, 50C performing game processing based on the operation information, may be taken as the operation-related information. The game system may be roughly divided into a first mode in which the game machine performs game processing, generates an image and displays the same, a second mode in which the server performs game processing and generates an image, and the game machine displays the image, and a third mode in which one game machine A performs game processing and displays an image, and another game machine B only generates and displays an image. In the case of the first mode, the destination of transmission of information from a game machine is another game machine. The first mode may be further divided into a mode in which a game machine transmits the operation information generated by the game controller to another game machine as the destination in each predetermined period of time (frame period), and a mode in which the game machine transmits information that is obtained by processing the operation information from the game controller, to another game machine as the destination as necessary. In the case of the second mode, the destination of transmission of information from a game machine is the game server. The second mode may be further divided into a mode in which a game machine transmits the operation information generated by the game controller to the server in each predetermined period of time (frame period) and the server transmits information (coordinates) for imaging to the game machine, and a mode in which the game machine transmits information that is obtained by processing the operation information from the game controller, to the server as necessary, and the server transmits a streaming video to the game machine. In the case of the third mode, the destination of transmission of information from the game machine A is the game machine B, and the destination of transmission of information from the game machine B is the game machine A, and the information transmission-side game machine transmits information that is obtained by processing the operation information from the game controller, to the destination game machine as necessary. Furthermore, in the case of the third mode, the transmission-side game machine transmits information (coordinates) for imaging to the destination game machine. Of these modes, the first and third modes in which the destination of transmission of information from a game machine is another game machine may be applied to the embodiments described above by categorizing information transmitted/received between the game machines as the operation-related information.

12. Supplementary Notes

Based on the description given above, the present invention is grasped in the following manner, for example.

(1)

A program according to an aspect of the present invention causes a computer to function as an information acquirer (110) that acquires transmission information from a plurality of terminals (50A, 50B, 50C) every predetermined period of time, the transmission information including operation-related information that is generated by each of the plurality of terminals in the predetermined period of time according to a user operation, an information manager (111) that saves the transmission information that follows a predetermined rule, among a plurality of pieces of the transmission information acquired in each predetermined period of time, and a transmission controller (113) that transmits the transmission information that is saved, to a terminal (50D) requesting acquisition of information.

(6)

An information processing method according to an aspect of the present invention is an information processing method performed by an information processing apparatus, the information processing method including: an information acquisition step (110) of acquiring transmission information from a plurality of terminals (50A, 50B, 50C) every predetermined period of time, the transmission information including operation-related information that is generated by each of the plurality of terminals in the predetermined period of time according to a user operation; an information management step (111) of saving the transmission information that follows a predetermined rule, among a plurality of pieces of the transmission information acquired in each predetermined period of time; and a transmission control step (113) of transmitting the transmission information that is saved, to a terminal (50D) requesting acquisition of information.

(7)

An information processing apparatus according to an aspect of the present invention includes: an information acquirer (110) configured to acquire transmission information from a plurality of terminals (50A, 50B, 50C) every predetermined period of time, the transmission information including operation-related information that is generated by each of the plurality of terminals in the predetermined period of time according to a user operation; an information manager (111) configured to save the transmission information that follows a predetermined rule, among a plurality of pieces of the transmission information acquired in each predetermined period of time; and a transmission controller (113) configured to transmit the transmission information that is saved, to a terminal requesting acquisition of information.

(8)

A game system according to an aspect of the present invention includes: an information acquirer (110) configured to acquire transmission information from a plurality of terminals (50A, 50B, 50C) every predetermined period of time, the transmission information including operation-related information that is generated by each of the plurality of terminals in the predetermined period of time according to a user operation; an information manager (111) configured to save the transmission information that follows a predetermined rule, among a plurality of pieces of the transmission information acquired in each predetermined period of time; and a transmission controller (113) configured to transmit the transmission information that is saved, to a terminal requesting acquisition of information.

According to the invention of (1), (6), (7) or (8) described above, the operation-related information from a plurality of terminals connected over a network may be transmitted to another terminal even when communication failure or an illicit process occurs with respect to one of the terminals, and thus, an image from a terminal connected over the network may be properly watched with other terminals.

(2)

In an aspect of the present invention according to the aspect of (1) described above, the information manager (110) saves, according to the predetermined rule, among the plurality of pieces of transmission information acquired from the plurality of terminals (50A, 50B, 50C) every predetermined period of time, the transmission information that is acquired first, and does not save second and later pieces of the transmission information.

According to the invention of (2) described above, even when one of a plurality of terminals connected over a network is disabled from performing communication, the operation-related information from each terminal may be transmitted to other terminals, and thus, an image from a terminal connected over the network may be properly watched with other terminals.

(3)

In an aspect of the present invention according to the aspect of (1) described above, the operation-related information that is generated by each of the plurality of terminals (50A, 50B, 50C) includes hash information that is generated by corresponding one of the plurality of terminals, and the information manager (110) saves the transmission information including only same pieces of hash information, among the plurality of pieces of transmission information acquired from the plurality of terminals every predetermined period of time, and does not save the transmission information including different pieces of hash information, according to the predetermined rule.

According to the invention of (3) described above, even when an illicit process is performed at one of a plurality of terminals connected over a network, the operation-related information from a terminal where an illicit process is not performed may be transmitted to other terminals, and thus, an image from a terminal connected over the network may be properly watched with other terminals.

(4)

In an aspect of the present invention according to the aspect of (1) described above, the operation-related information that is generated by each of the plurality of terminals (50A, 50B, 50C) includes hash information that is generated by corresponding one of the plurality of terminals, and in a case where different pieces of hash information are in the transmission information that is acquired from the plurality of terminals every predetermined period of time, the information manager (110) saves the operation-related information for which there is a greater number of same pieces of hash information, and does not save the operation-related information for which there is a smaller number of same pieces of hash information, according to the predetermined rule.

According to the invention of (4) described above, even when an illicit process is performed at one of a plurality of terminals connected over a network, the operation-related information from a terminal where an illicit process is not performed may be transmitted to other terminals, and thus, an image from a terminal connected over the network may be properly watched with other terminals.

(5)

In an aspect of the present invention according to any one of the aspects of (1) to (4) described above, the terminals (50A, 50B, 50C, 50D) are game terminals, the information acquirer (110) acquires the transmission information from a game terminal (50A, 50B, 50C) competing with another game terminal, and the transmission controller (113) transmits the transmission information that is saved, in response to a request for transmission of the information from the terminal (50D) that is not competing.

According to the invention of (5) described above, the operation-related information from a plurality of game machines that are connected over a network and that are participating in an online competition may be transmitted to a game machine of a spectator even when a game machine as a representative is disabled from performing communication or an illicit process is performed at one of the competing game machines, and thus, the game machine of the spectator may perform a process of allowing a game that is being played to proceed based on the operation-related information and may keep displaying the image of the game that is being played, and the spectator is enabled to watch the game that is being played.

REFERENCE SIGNS LIST

10: first server
20: network
30: second server
50A, 50B, 50C, 50D: game machine
11, 51: CPU
12, 52: ROM
13, 53: RAM
14, 54: communication unit
15, 55: storage device 16, 56: operation unit
57: display unit
40: game controller
110: information acquisition unit
111: information management unit
112: information storage unit
113: transmission control unit
510: game control unit
511: operation information acquisition unit
512: operation-related information generation unit
513: communication control unit

The invention claimed is:

1. A non-transitory computer-readable storage medium storing one or more programs which, when executed by a central processing unit (CPU), causes the CPU to at least:
acquire transmission information from each of a plurality of terminals participating in an online competition every predetermined period of time, the transmission information including all of operation-related information which are generated by each of the plurality of terminals, as the operation-related information that is generated by each of the plurality of terminals in the predetermined period of time according to a user operation,
save the transmission information that follows a predetermined rule, among a plurality of pieces of the transmission information acquired from each of the plurality of terminals in each predetermined period of time, and
transmit the transmission information that is saved, to a terminal requesting acquisition of information.

2. The non-transitory computer-readable storage medium according to claim 1, wherein the one or more programs, when executed by the CPU, further causes the CPU to save, according to the predetermined rule, among the plurality of pieces of transmission information acquired from the plurality of terminals every predetermined period of time, the transmission information that is acquired first, and does not save second and later pieces of the transmission information.

3. The non-transitory computer-readable storage medium according to claim 2, wherein
the plurality of terminals are game terminals, and
the one or more programs, when executed by the CPU, causes the CPU to:
acquire the transmission information from a game terminal competing with another game terminal, and
transmit the transmission information that is saved, in response to a request for transmission of the information from the terminal requesting acquisition of information that is not competing.

4. The non-transitory computer-readable storage medium according to claim 1, wherein:
the operation-related information that is generated by each of the plurality of terminals includes hash information that is generated by corresponding one of the plurality of terminals, and
the one or more programs, when executed by the CPU, causes the CPU to save the transmission information including only same pieces of hash information, among the plurality of pieces of transmission information acquired from the plurality of terminals every predetermined period of time, and does not save the transmission information including different pieces of hash information, according to the predetermined rule.

5. The non-transitory computer-readable storage medium according to claim 4, wherein;
the plurality of terminals are game terminals, and
the one or more programs, when executed by the CPU, causes the CPU to:
acquire the transmission information from a game terminal competing with another game terminal, and
transmit the transmission information that is saved, in response to a request for transmission of the information from the terminal requesting acquisition of information that is not competing.

6. The non-transitory computer-readable storage medium according to claim 1, wherein;
the operation-related information that is generated by each of the plurality of terminals includes hash information that is generated by corresponding one of the plurality of terminals, and
the one or more programs, when executed by the CPU, causes the CPU to, in a case where different pieces of hash information are in the transmission information that is acquired from the plurality of terminals every predetermined period of time, save the operation-related information for which there is a greater number of same pieces of hash information, and does not save the operation-related information for which there is a smaller number of same pieces of hash information, according to the predetermined rule.

7. The non-transitory computer-readable storage medium according to claim 6, wherein
the plurality of terminals are game terminals, and
the one or more programs, when executed by the CPU, causes the CPU to:
acquire the transmission information from a game terminal competing with another game terminal, and
transmit the transmission information that is saved, in response to a request for transmission of the information from the terminal requesting acquisition of information that is not competing.

8. The non-transitory computer-readable storage medium according to claim 1, wherein;
the plurality of terminals are game terminals, and
the one or more programs, when executed by the CPU, causes the CPU to:
acquire the transmission information from a game terminal competing with another game terminal, and
transmit the transmission information that is saved, in response to a request for transmission of the information from the terminal requesting acquisition of information that is not competing.

9. An information processing method performed by an information processing apparatus, the information processing method comprising:
acquiring transmission information from each of a plurality of terminals participating in an online competition every predetermined period of time, the transmission information including all of operation-related information which are generated by each of the plurality of terminals, as the operation-related information that is generated by each of the plurality of terminals in the predetermined period of time according to a user operation;
saving the transmission information that follows a predetermined rule, among a plurality of pieces of the transmission information acquired from each of the plurality of terminals in each predetermined period of time; and transmitting the transmission information that is saved, to a terminal requesting acquisition of information.

10. A system comprising:
a memory storing one or more programs; and
a central processing unit (CPU),
wherein the CPU accesses the memory and executes the one or more programs to cause the CPU to acquire transmission information from each of a plurality of terminals participating in an online competition every predetermined period of time, the transmission information including all of operation-related information which are generated by each of the plurality of terminals, as the operation-related information that is generated by each of the plurality of terminals in the predetermined period of time according to a user operation;
the CPU accesses the memory and executes the one or more programs to cause the CPU to save the transmission information that follows a predetermined rule, among a plurality of pieces of the transmission information acquired from each of the plurality of terminals in each predetermined period of time; and
the CPU accesses the memory and executes the one or more programs to cause the CPU to transmit the transmission information that is saved, to a terminal requesting acquisition of information.

* * * * *